United States Patent

[11] 3,542,107

| [72] | Inventors | Harold E. Mills<br>Akron;<br>Donald L. Knight, Kent, Ohio |
|---|---|---|
| [21] | Appl. No. | 776,572 |
| [22] | Filed | Nov. 18, 1968 |
| [45] | Patented | Nov. 24, 1970 |
| [73] | Assignee | The Goodyear Tire & Rubber Company<br>Akron, Ohio<br>a corporation of Ohio |

[54] PNEUMATIC TIRE
3 Claims, 3 Drawing Figs.

[52] U.S. Cl. .................................................. 152/352,
18/6
[51] Int. Cl. ........................................................ B60c 3/00
[50] Field of Search... .......................................... 152/352,
330, 354, 356, 357, 355

[56] References Cited
UNITED STATES PATENTS

| 3,097,681 | 7/1963 | Harkins | 152/352 |
| 3,062,258 | 11/1962 | Maiocchi | 152/356 |
| 1,846,042 | 2/1932 | Taylor | 152/352 |

*Primary Examiner*—Arthur L. La Point
*Attorney*—F. W. Brunner and M. William Goodwin

ABSTRACT: A bias ply carcass pneumatic tire wherein the tire is maintained in a predetermined shape during curing, and particularly wherein the upper sidewall portion of the tire has in cross section a predetermined convex curvature. The carcass of the resulting tire when the tire is inflated to normal operating pressure and deflected within the normal load range of the tire is free of any reverse curvatures in the upper sidewall portions of the deflected portion of the carcass, particularly adjacent the tread edge.

Patented Nov. 24, 1970
3,542,107
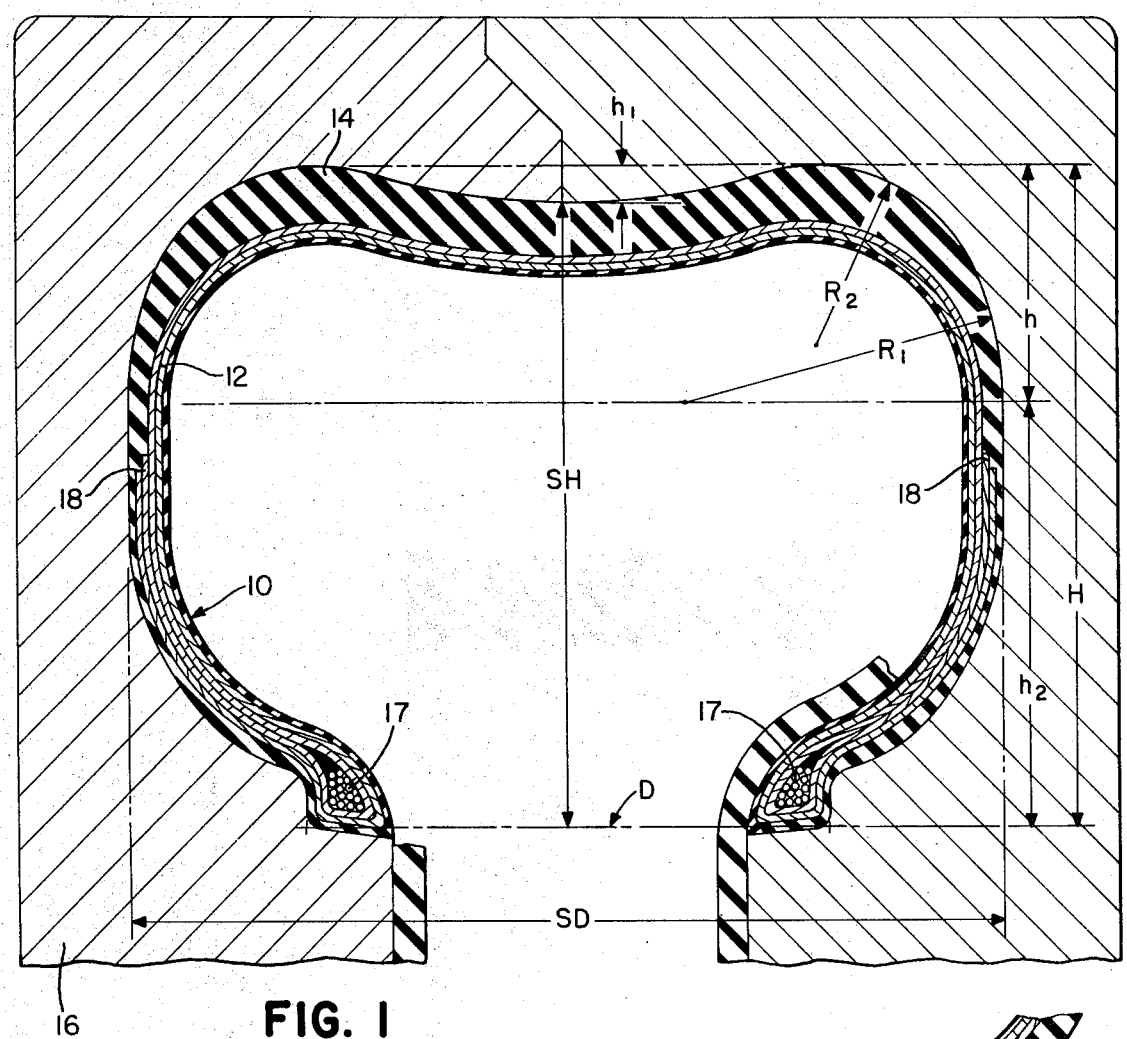
FIG. 1
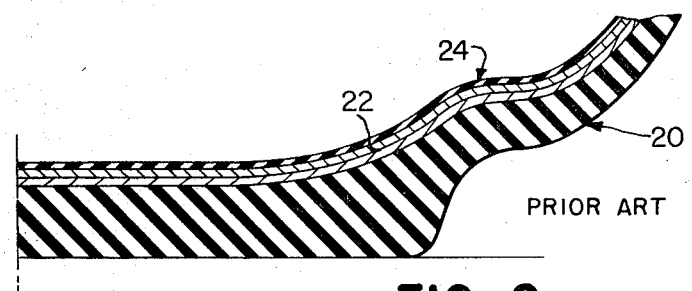
PRIOR ART
FIG. 2
FIG. 3
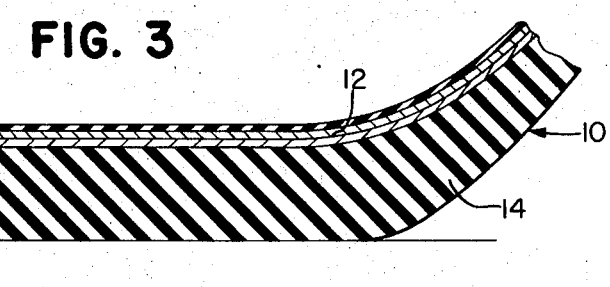
INVENTORS
HAROLD E. MILLS
DONALD L. KNIGHT
BY *M William Goodwin*
ATTORNEY

PNEUMATIC TIRE

This invention relates to a novel and improved pneumatic tire and a method of manufacturing the same.

It is an object of the present invention to provide in a pneumatic tire having a bias ply carcass improved resistance to separation of components of the tire, including plies, belts or breakers, particularly in the shoulder regions of the tire. It is further an object of this invention to provide such a tire which when the tire is utilized for passenger vehicles, including high-speed vehicles such as racing vehicles, the tire will provide improved handling and cornering performances as well as improved lateral stability.

Other objects will be in part obvious, and in part pointed out more in detail hereinafter.

The invention accordingly comprises the features of construction, combination of elements and arrangement of parts which will be exemplified in the construction hereafter set forth and the scope of the application of which will be indicated in the appended claims.

In the drawings:

FIG. 1 is a cross-sectional view of a tire in a shape in which, in accordance with the invention, it is maintained during curing of the tire;

FIG. 2 is a fragmentary cross-sectional view of a deflected tire of a prior art type; and FIG. 3 is a view similar to FIG. 2, but illustrating the improvement obtained with a tire of the present invention when the tire is deflected.

With reference to the drawings and particularly FIG. 1, a tire illustrative of the present invention is generally illustrated at 10 and comprises a bias ply carcass 12 and a tread portion 14 disposed circumferentially about and radially outwardly of the carcass 12. The tire 10 is shown confined within a curing mold 16. While the tire 10 is shown devoid of any belts, breakers or other elements disposed outwardly of the carcass and which tend to protect, reinforce or restrain the tread or carcass, it will be understood that such protecting, reinforcing or restraining elements may be provided, if desired.

In accordance with the invention, the tire is maintained in a predetermined shape during the curing of the tire. The tire may conveniently be maintained in this shape by being constrained within a mold. The shape in which the tire is maintained is generally toroidal and in this shape the tire has, in cross section, certain critical dimensional relationships. For the purpose of this invention, all cross-sectional dimensions of the tire will be made with reference to the cross section of the tire as it appears in a plane within which lies the rotational axis of the tire.

With reference to FIG. 1, the tire has, when in the shape in which it is cured, a bead base-line D which extends parallel to the rotational axis of the tire and is spaced radially therefrom a distance equal to the nominal radius of the rim on which the particular tire is intended to be mounted. The maximum cross-sectional width of the tire, as measured parallel to the tire rotational axis, is indicated at SD. For the purpose of this invention, the dimension SD is taken between the outer surfaces of the tire at its widest point, such surfaces being referred to as the primary outer surfaces of the tire exclusive of any adornment, design or lettering or the like, which would be raised above the main or primary external surfaces of the tire. The maximum cross section height of the tire is indicated at H and is the distance measured radially of the rotational axis of the tire from the bead base-line D to the radially outermost point of the tire wherever this be located in the particular tire. The section height, SH, is the distance as measured radially of the tire rotational axis between the bead base-line D and the radially outermost surface of the tire at the circumferential centerline of the tire tread.

In the shape illustrated in FIG. 1, it will be observed that H is larger than SH, and that a dimension H is located at a pair of points spaced laterally outwardly from and on opposite sides, respectively, of the circumferential centerline of the tread. Accordingly, the tire shown in FIG. 1 is what may be referred to as reverse molded in that the center portion of the tread is during molding and curing of the tire depressed below the portions of the tread on the opposite sides of the center thereof. However, this invention is not limited to a reverse molded tire but is applicable to tires which are reverse molded or are cured with the tread outer surface being substantially flat in cross section or to tires wherein the maximum height of the tire in cross section occurs at the circumferential centerline of the tire so that the outer surface of the tread is convex. Also this invention is applicable to tires which are either low molded, natural shape molded, or high molded. Generally speaking, a low molded tire is one which is characterized by an increase in its section height or outer diameter when the tire is inflated. In other words, it is a tire which has a section height or outer diameter which is substantially less when the tire is molded than it is when the tire is later inflated. A natural shape tire is generally considered one in which the section height or outer diameter does not change significantly when the tire is inflated; in other words, the tire is molded in substantially its inflated shape. A high molded tire is one in which the section height or outer diameter of the tire decreases when the tire is inflated.

In accordance with the present invention the tire is maintained during curing thereof in a shape in which SD is spaced from the base-line D a distance at least greater than 60 percent H. Further, in accordance with the present invention, the primary outer surfaces of the upper sidewall portions of the tire each extends in a predetermined path from the portion of the sidewall at the maximum sectional width of the tire to the lateral edge portion of the ground contacting portion of the tread 14. The upper sidewall portion of the tire for the purpose of this invention is defined as that portion of the tire extending from the maximum sectional width of the tire to the lateral edge of the tread and includes the shoulder region of the tire. By the shoulder region is meant that portion of the tire next adjacent the lateral edge of the ground contacting portion of the tread and disposed outwardly thereof a short distance. The shoulder region of the tread may be in contact with the ground, or at least partially so, at certain times, for example, during cornering of the vehicle. The term "ground contacting portion" of the tread as used herein defines that portion of the tread which contacts the ground or road during normal straight-line travel of the tire under normal inflation pressures and loads. More particularly, the contour of each upper sidewall portion of the tire is convex and is smooth and continuous in the sense that there are no reverse curvatures therein as is commonly the case in the usual profiled shoulder of conventional treads normally associated, for example, with tires for passenger vehicles for traveling on public highways.

Still more specifically, and in accordance with the invention, the upper sidewall portion of the tire is provided at its primary external surface with a convex curvature described by a radius of curvature $R_1$ which is between 100 and 200 percent h and with the center of curvature thereof being located inwardly of the tire with respect to the upper sidewall surface being considered. Preferably the center of curvature is located on the SD line of the tire, or in other words, is spaced from the bead base-line D the same distance as is the maximum sectional width of the tire. Where the tire is of a size consistent with use on passenger vehicles the radius $R_1$ should be between 1.5 and 4.0 inches. In the particular embodiment shown in FIG. 1 the arc defined by the radius $R_1$ extends a substantial angular distance but terminates closely adjacent to or within the shoulder region of the tire. The remainder of the primary external surface of the upper sidewall portion of the tire is formed by a second arc which is a continuation of the first and has a radius of curvature $R_2$ which is substantially less than the radius $R_1$. This second arc merges smoothly into the lateral edge of the tread and with the first arc forms a continuous convex external surface on the tire which is free of any reverse curvature. While the arc defined by the radius $R_1$ may in certain embodiments extend to the lateral edge of the ground contacting portion of the tread, it may, as illustrated heretofore, terminate short of the tread, but in any event should not terminate at a point below 50 percent of the h dimension. The dimension h, as illustrated in FIG. 1, is the distance between the point of maximum section width of the tire and the maximum height of the tire measured radially of the tire rotational axis. Also, in a tire of this invention the radius $R_1$ or $R_2$ is substantially less than the radius of curvature of at least the center portion of the ground contacting portion of the tread of the tire as measured in a cross-sectional plane of the tire and when the tire is inflated. It will further be understood that all of the dimensions and relationships heretofore given, other than the tread radius of the inflated tire, are with respect to the cross-sectional shape in which the tire is maintained during curing of the tire.

In a bias ply carcass pneumatic tire constructed as described thus far and with reference to FIGS. 2 and 3 the performance of the tire is substantially different from the performance of prior art bias ply carcass tires. With particular reference to FIG. 2, there is shown a prior art tire 20 which is mounted on a rim (not shown), inflated to normal operating pressure, and deflected within the normal operating load range of the tire. As shown in FIG. 2, the tire has a substantial reverse curvature in the upper sidewall portion thereof. When the tire is deflected the carcass also assumes a reverse curvature, as indicated at 24; this reverse curvature of the carcass not being present in the inflated but unloaded tire. With reference to FIG. 3, the tire 10 of this invention is also shown mounted on a rim (not shown) and inflated to normal operating pressure and deflected within the normal load range of the tire. It will be seen in FIG. 3 that the carcass 12 is free of any reverse curvatures in the upper sidewall region of the tire and particularly the shoulder region thereof. This improved performance in the shoulder region of the tire tends to improve resistance of the tire to separation in this region of the tire. Also, this improved characteristic of the deflected carcass tends to improve handling, cornering and lateral stability of a bias angle carcass tire.

In a tire of the type shown and described the performance of the tire, particularly in connection with high-speed vehicles such as racing cars, may be further improved by providing the plies of the carcass with what is referred to as a high turn-up wherein the ends 18 of the carcass plies which are turned about the beads 17 of the tire extend up the sidewall of the tire a distance at least equal to 50 percent of the maximum height H of the tire. A tire so constructed will provide still improved lateral stability both in high-speed turns as well as in high-speed straight-line driving.

While certain representative embodiments and details have been shown for the purpose of illustrating the invention, it will be apparent to those skilled in this art that various changes and modifications may be made therein without departing from the invention.

We claim:

1. A pneumatic tire comprising a bias ply carcass, a pair of beads at the radially inner ends of the carcass, a tread portion disposed outwardly of and about the carcass and a pair of upper sidewall portions each having a primary external surface, said tire being characterized by: when the tire is in the shape in which it was cured a cross-sectional configuration in which the maximum sectional width of the tire is spaced from the bead base-line a predetermined distance greater than .6 the maximum height of the tire and each primary external surface of said upper sidewall portions of the tire is in its entirety convex and has over a substantial portion thereof extending from the maximum sectional width of the tire a radius of curvature which is from 100 to 200 percent of the difference between the maximum section height of the tire and said predetermined distance; when the tire is mounted on a rim, inflated to a normal inflation pressure and deflected within the normal operating load range of the tire said carcass and said primary external surface being in the deflected portion of said upper sidewall portions in their entirety smoothly convex; and, when said tire is inflated to a normal inflation pressure and undeflected having no radius of curvature in said primary external surface which is not substantially less than the radius of curvature of said tread portion at the center portion thereof.

2. In a pneumatic tire as claimed in claim 1, each said external surface of the tire in a cross section of the tire consisting of a plurality of end connected curves each forming a smooth continuation of the other, the centers of curvature of each curve being disposed inwardly of said carcass with respect to said curve.

3. In a tire as described in either one of claims 1 or 2, said carcass including bead portions and at least two reinforcing plies the ends of which are turned about bead portions within the tire, the end of each ply respectively associated with a bead portion extending beyond the bead and up the sidewall of the tire a distance at last equal to 50 percent of the maximum height of the tire.

UNITED STATES PATENT OFFICE
CERTIFICATE OF CORRECTION

Patent No. 3,542,107  Dated November 24, 1970

Inventor(s) Donald L Knight and Harold E Mills

It is certified that error appears in the above-identified patent and that said Letters Patent are hereby corrected as shown below:

On the first page of the printed patent immediately following the last line of the Abstract of the Disclosure, insert:

"The foregoing abstract is not to be taken as limiting the invention of this application, and in order to understand the full nature and extent of the technical disclosure of this application, reference must be made to the accompanying drawing and the following detailed description."

Column 4, line 43, delete "last" and insert --least--.

Signed and sealed this 11th day of May 1971.

(SEAL)
Attest:

EDWARD M. FLETCHER, JR.
Attesting Officer

WILLIAM E. SCHUYLER, JR
Commissioner of Patent